(12) United States Patent
Nonoyama

(10) Patent No.: US 10,879,541 B2
(45) Date of Patent: Dec. 29, 2020

(54) FUEL CELL STACK

(71) Applicant: TOYOTA JIDOSHA KABUSHIKI KAISHA, Toyota (JP)

(72) Inventor: Nobuaki Nonoyama, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 16/281,444

(22) Filed: Feb. 21, 2019

(65) Prior Publication Data

US 2019/0288302 A1 Sep. 19, 2019

(30) Foreign Application Priority Data

Mar. 13, 2018 (JP) .................................. 2018-045741

(51) Int. Cl.
*H01M 8/0267* (2016.01)
*H01M 8/04029* (2016.01)
*H01M 8/2483* (2016.01)

(52) U.S. Cl.
CPC ..... *H01M 8/0267* (2013.01); *H01M 8/04029* (2013.01); *H01M 8/2483* (2016.02)

(58) Field of Classification Search
CPC ........... H01M 8/0267; H01M 8/04029; H01M 8/2483
See application file for complete search history.

(56) References Cited

U.S. PATENT DOCUMENTS

2004/0106028 A1* 6/2004 Sugiura ............... H01M 8/0263
429/434

FOREIGN PATENT DOCUMENTS

JP 2009-016070 A 1/2009
JP 2017-091632 A 5/2017

* cited by examiner

*Primary Examiner* — Victoria H Lynch
(74) *Attorney, Agent, or Firm* — Oliff PLC

(57) ABSTRACT

A fuel cell stack that can suppress degraded cooling performance due to the presence of air bubbles. The fuel cell stack includes a plurality of stacked fuel cells, each fuel cell having a power generation portion and a pair of separators. The fuel cell stack further includes a plurality of refrigerant channels inside the power generation portion that are provided in a region corresponding to the power generation portion and that allow communication between the refrigerant inlet manifold and refrigerant outlet manifold, and a refrigerant channel outside the power generation portion that is provided in a region above the power generation portion in the gravity direction and that allows communication between the refrigerant inlet manifold and refrigerant outlet manifold. The refrigerant channels inside and outside the power generation portion communicate with each other.

3 Claims, 5 Drawing Sheets

FUEL CELL STACK

CROSS REFERENCE TO RELATED APPLICATIONS

The present application claims priority from Japanese patent application JP 2018-045741 filed on Mar. 13, 2018, the content of which is hereby incorporated by reference into this application.

BACKGROUND

Technical Field

The present disclosure relates to a fuel cell stack.

Background Art

Conventional examples of techniques in this field include the one described in JP 2009-16070 A. A fuel cell stack described in JP 2009-16070 A includes a plurality of stacked fuel cells, each fuel cell having a membrane electrode assembly and a pair of separators that sandwich the membrane electrode assembly, and one side of each separator having formed thereon reactant gas channels through which a reactant gas flows and the other side of each separator having formed thereon refrigerant channels through which a refrigerant flows.

SUMMARY

However, in such a fuel cell stack, if air bubbles are mixed into a refrigerant, the air bubbles also enter the refrigerant channels along with the flow of the refrigerant. This may lead to degraded cooling performance.

The present disclosure has been made to overcome such a technical problem, and provides a fuel cell stack that can suppress such degraded cooling performance due to the presence of air bubbles.

The fuel cell stack according to the present disclosure includes a plurality of stacked fuel cells, each fuel cell having a power generation portion and a pair of separators sandwiching the power generation portion; a refrigerant inlet manifold and a refrigerant outlet manifold disposed at a distance from each other; a plurality of refrigerant channels inside the power generation portion that are provided in a region corresponding to the power generation portion and that allow communication between the refrigerant inlet manifold and the refrigerant outlet manifold; and a refrigerant channel outside the power generation portion that is provided in a region above the power generation portion in the gravity direction and that allows the communication between the refrigerant inlet manifold and the refrigerant outlet manifold, in which the refrigerant channels inside and outside the power generation portion communicate with each other.

In the fuel cell stack according to the present disclosure, since the refrigerant channels inside and outside the power generation portion communicate with each other, if air bubbles are mixed into a refrigerant flowing through the refrigerant channels inside the power generation portion, the mixed air bubbles can move up to the refrigerant channel outside the power generation portion that is positioned above the refrigerant channels inside the power generation portion in the gravity direction. Thus, the air bubbles mixed in the refrigerant flowing through the refrigerant channels inside the power generation portion are reduced, thereby being able to suppress the degraded cooling performance due to the presence of air bubbles.

In some embodiments of the fuel cell stack according to the present disclosure, the refrigerant inlet manifold and the refrigerant outlet manifold are disposed in a direction orthogonal to the gravity direction.

In some embodiments of the fuel cell stack according to the present disclosure, each separator has alternately disposed thereon a plurality of recesses that form the refrigerant channels inside the power generation portion and projections that form reactant gas channels, and the refrigerant channels inside the power generation portion that are adjacent to each other communicate with each other, and the refrigerant channel outside the power generation portion and its adjacent refrigerant channel inside the power generation portion communicate with each other, each via constricted portions, the constricted portions being formed on the projections and projecting less than the projections. Such a configuration facilitates the communication between the adjacent refrigerant channels inside the power generation portion as well as between the refrigerant channel outside the power generation portion and its adjacent refrigerant channel inside the power generation portion, with a simple structure.

In some embodiments of the fuel cell stack according to the present disclosure, the cross-section in the gravity direction of the refrigerant channel outside the power generation portion is larger than that of each refrigerant channel inside the power generation portion. Such a configuration allows the refrigerant to flow faster through the refrigerant channel outside the power generation portion, so that air bubbles that have collected in the refrigerant channel outside the power generation portion can be quickly discharged to the outside. Therefore, even when a large quantity of air bubbles are present, diffusion of the air bubbles to the refrigerant channels inside the power generation portion can be avoided, so that insufficient heat-releasing performance of the power generation portion due to the presence of air bubbles can be further suppressed.

According to the present disclosure, the degraded cooling performance due to the presence of air bubbles can be suppressed.

DETAILED DESCRIPTION

An embodiment of the fuel cell stack according to the present disclosure will be described with reference to the drawings. The fuel cell stack according to the present disclosure may be mounted on and used as a drive source for vehicles, vessels, aircrafts, trains, and the like, or used for a power generation facility of buildings.

Figure 1:
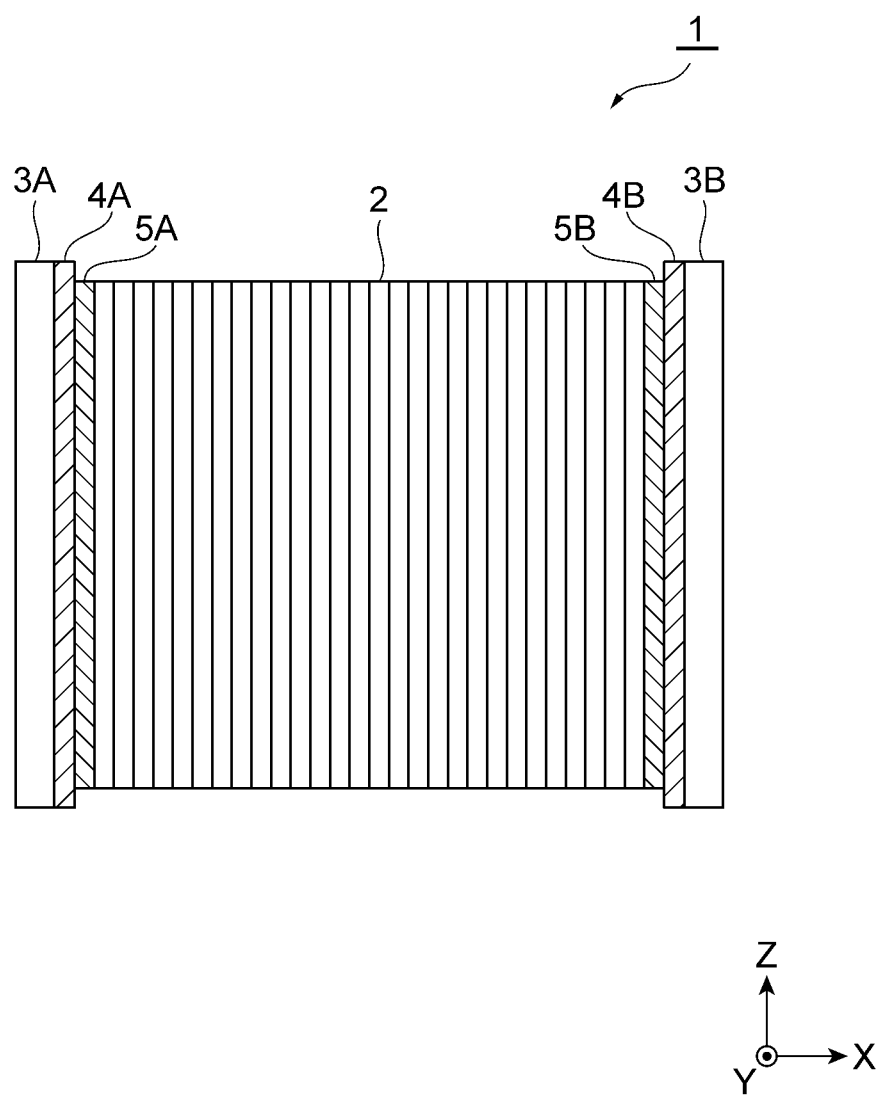
FIG. 1 is a side view of a fuel cell stack according to an embodiment.
Figure 2:
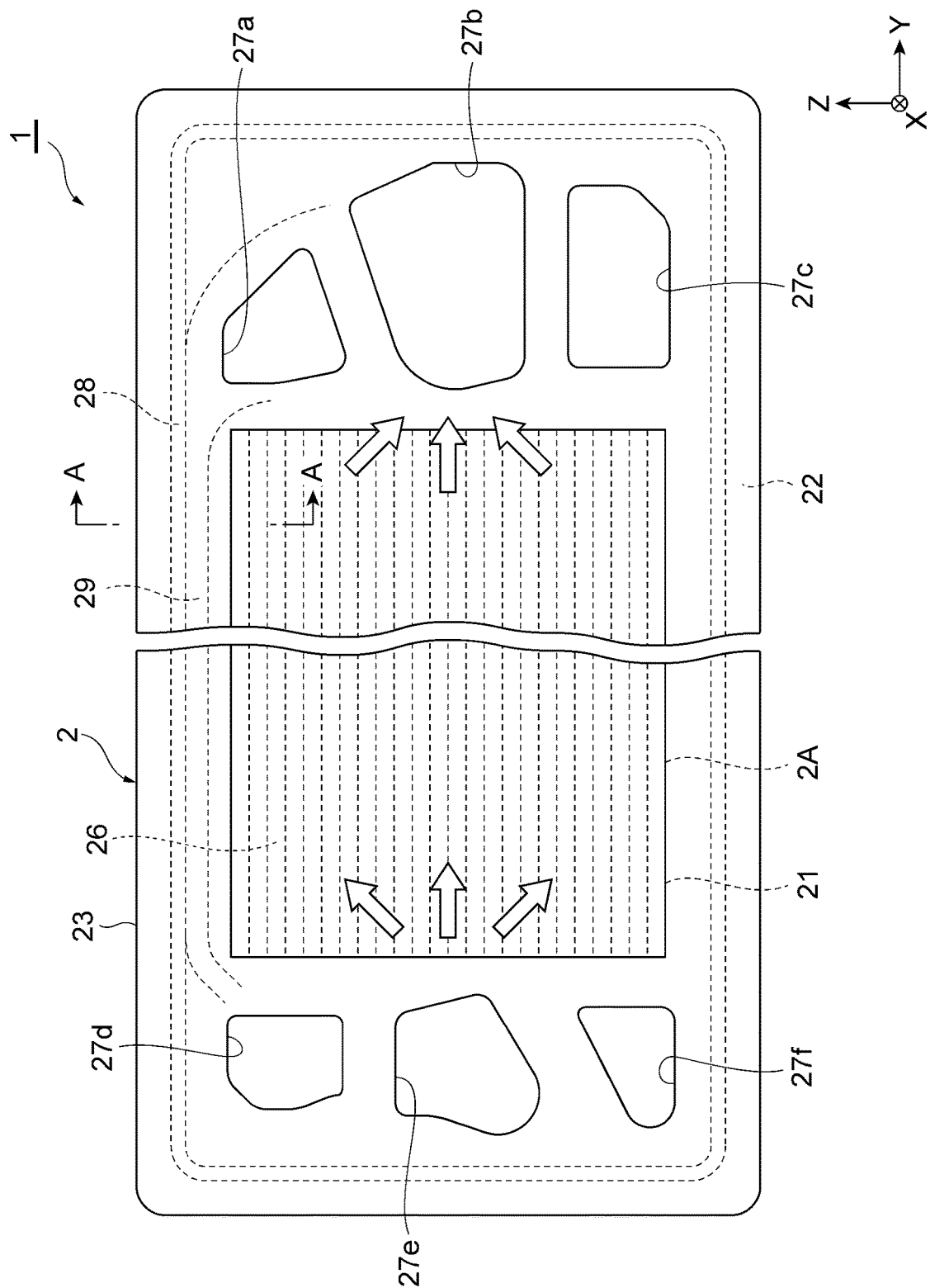
FIG. 2 is a front view of the fuel cell stack according to the embodiment.
Figure 3:
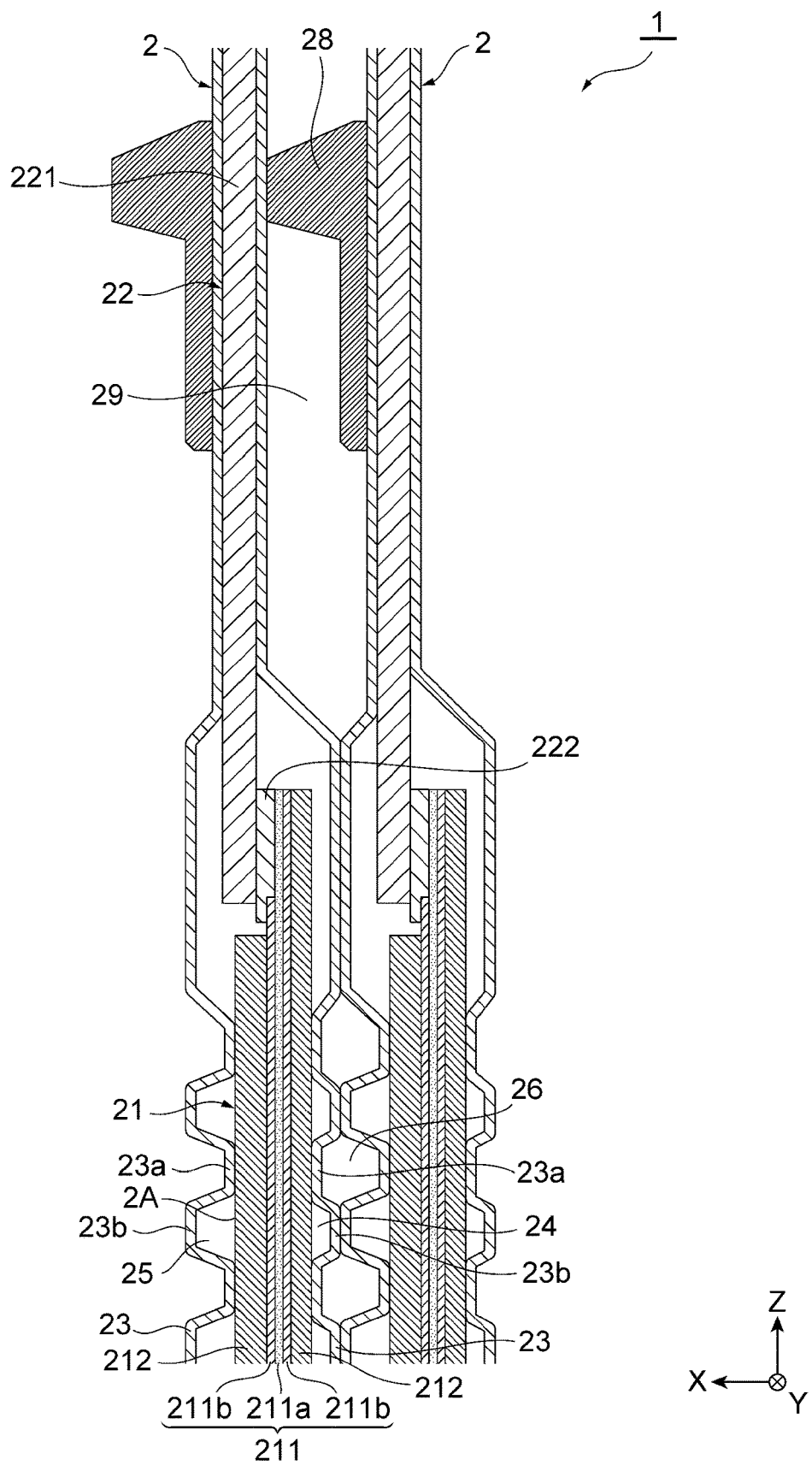
FIG. 3 is a partial cross-sectional view of the fuel cell stack taken along line A-A of FIG. 2.

FIG. 1 is a side view of a fuel cell stack according to an embodiment; FIG. 2 is a front view of the fuel cell stack according to the embodiment; and FIG. 3 is a partial cross-sectional view of the fuel cell stack taken along line A-A of FIG. 2. Symbols X, Z, and Y in the drawings represent the stacking direction of fuel cells, the gravity direction, and the horizontal direction orthogonal to both the stacking direction X and the gravity direction Z, respectively. Further, FIG. 2 does not illustrate an end plate, insulating plate, or current collecting plate, for easier understanding of the internal structure of each fuel cell.

As illustrated in FIG. 1, a fuel cell stack 1 of the present embodiment has a structure in which an end plate 3A, insulating plate 4A, current collecting plate 5A, a plurality of fuel cells 2, current collecting plate 5B, insulating plate 4B, and end plate 3B are stacked in this order. The plurality of fuel cells 2 are securely fastened by the end plates 3A and 3B on the opposite sides of the fuel cell stack 1 in the stacking direction X with a predetermined compression load.

The fuel cells 2, each of which is in a thin plate shape, are unit cells of a polymer electrolyte fuel cell. Each fuel cell 2 has a membrane electrode and gas diffusion layer assembly (MEGA) 21 disposed in the center position thereof, a frame-shaped sealing portion 22 disposed on the outer periphery of the MEGA 21 such that it surrounds the MEGA 21, and a pair of separators (that is, anode and cathode separators) 23 sandwiching the MEGA 21 and sealing portion 22. The polymer electrolyte fuel cell is formed by stacking the fuel cells 2 with the aforementioned structure in the stacking direction X such that each fuel cell 2 is positioned longitudinally in the gravity direction Z.

The MEGA 21 in a rectangular shape as viewed from the stacking direction X has an integral structure of a membrane electrode assembly (MEA) 211 and gas diffusion layers 212 disposed on the opposite sides of the MEA 211 in the stacking direction X. The MEA 211 includes an electrolyte membrane 211a and a pair of electrode catalyst layers 211b joined so as to sandwich the electrolyte membrane 211a. The electrolyte membrane 211a is a proton-conductive ion-exchange membrane made of a solid polymer material. The electrode catalyst layers 211b are made of, for example, a porous carbon material that carries a catalyst, such as platinum. The electrode catalyst layer 211b on one side of the electrolyte membrane 211a is an anode electrode catalyst layer and the electrode catalyst layer 211b on the other side of the electrolyte membrane 211a is a cathode electrode catalyst layer. The gas diffusion layers 212 are made of, for example, a gas-permeable conductive member, such as a carbon porous body like carbon paper or carbon cloth, or a metal porous body like a metal mesh or foam metal. Further, a region where the anode and cathode electrode catalyst layers 211b face each other is a power generation portion 2A of each fuel cell 2.

Each separator 23 is disposed in contact with the gas diffusion layers 212 of the MEGAs 21. The separator 23 is made of, for example, a gas-impermeable high-density carbon member of compressed carbon particles or a metal member, such as press-formed stainless steel or titanium.

Further, the fuel cell stack 1 of the present embodiment includes a plurality of fuel gas channels 24 adapted to supply a fuel gas to the fuel cells 2, a plurality of oxidant gas channels 25 adapted to supply an oxidant gas to the fuel cells 2, and a plurality of refrigerant channels 26 inside the power generation portion that are adapted to supply a refrigerant to the fuel cells 2.

Specifically, as illustrated in FIG. 3, a portion of each separator 23 corresponding to the power generation portion 2A is in a wave-like shape with recesses 23a and projections 23b alternately formed thereon. The bottom portion of each recess 23a is flat and is in surface contact with the gas diffusion layer 212 of the MEGA 21, while the top portion of each projection 23b is also flat and is in surface contact with the top portion of the adjacent projection 23b of the adjacent separator 23.

One of the pair of gas diffusion layers 212 forms a fuel gas channel 24 through which a fuel gas flows, together with a projection 23b of an adjacent separator 23. Meanwhile, the other of the pair of gas diffusion layers 212 forms an oxidant gas channel 25 through which an oxidant gas flows, together with a projection 23b of another adjacent separator 23. It should be noted that the oxidant gas and fuel gas correspond to the "reactant gas" in the "reactant gas channels" recited in the claims, and the "reactant gas channels" correspond to the fuel gas channel 24 and oxidant gas channel 25 that are straight or softly curved along the horizontal direction Y.

Further, adjacent fuel cells 2 are stacked such that the electrode catalyst layer (for example, the anode electrode catalyst layer) 211b of one fuel cell 2 and the electrode catalyst layer (for example, the cathode electrode catalyst layer) 211b of the other fuel cell 2 face each other. With such an arrangement, a space for the flow of a refrigerant, that is, a refrigerant channel 26 inside the power generation portion is formed between the adjacent recesses 23a of the adjacent separators 23. The refrigerant channel 26 inside the power generation portion is provided in a region corresponding to the power generation portion 2A such that it extends in the horizontal direction Y, and allows the communication between a refrigerant inlet manifold 27e and a refrigerant outlet manifold 27b (the refrigerant inlet manifold 27e and refrigerant outlet manifold 27b will be described later). It should be noted that the refrigerant to be used includes water and an antifreeze solution, such as ethylene glycol.

As illustrated in FIG. 2, one side of each fuel cell 2 across the power generation portion 2A (the right side in the horizontal direction Y in FIG. 2) has disposed therein a fuel gas inlet manifold 27a, refrigerant outlet manifold 27b, and oxidant gas outlet manifold 27c in this order from the top in the gravity direction Z, while the other side of each fuel cell 2 across the power generation portion 2A (the left side in the horizontal direction Y in FIG. 2) has disposed therein an oxidant gas inlet manifold 27d, refrigerant inlet manifold 27e, and fuel gas outlet manifold 27f in this order from the top in the gravity direction Z. Further, the refrigerant inlet manifold 27e and refrigerant outlet manifold 27b are disposed at a distance in the horizontal direction Y.

Meanwhile, the sealing portion 22 has a core layer 221 disposed in an intermediate position of the sealing portion 22 and the pair of separators 23 sandwiching the core layer 221 (see FIG. 3). The core layer 221 is made of, for example, a thermoplastic resin, and is securely bonded to the separators 23 via resin adhesive layers (not shown). The lower end portion of the core layer 221 is securely bonded to the upper end portion of the MEA 211 via an adhesive layer 222.

Portions of the separators 23 sandwiching the sealing portion 22 are the upper end portions of the separators 23 sandwiching the MEGA 21 that are extended to the sealing portion 22. As illustrated in FIG. 3, adjacent separators 23 of two adjacent fuel cells 2 and a gasket 28 (which will be described later) form a space for a refrigerant channel 29 outside the power generation portion between the two adjacent fuel cells 2 in a region above the power generation portion 2A in the gravity direction Z. It should be noted that the expression "outside the power generation portion" herein refers to the region including the sealing portion 22 and excluding the power generation portion 2A of each fuel cell 2.

The refrigerant channel 29 outside the power generation portion, extending in the horizontal direction Y, allows the communication between the refrigerant inlet manifold 27e and the refrigerant outlet manifold 27b. Further, the refrigerant channel 29 outside the power generation portion widens at its end on the side of the refrigerant outlet manifold 27b so as to surround the fuel gas inlet manifold 27a disposed above the refrigerant outlet manifold 27b (see FIG. 2).

The fuel cell stack 1 further includes the gasket 28 as a sealing member disposed between adjacent fuel cells 2. The gasket 28 is made of rubber, thermoplastic elastomer, or the like, and is press-fitted between the adjacent separators 23 of the two adjacent fuel cells 2 so as to seal the space between the adjacent separators 23. As illustrated in FIG. 2, the gasket 28 is formed in an annular shape such that it surrounds the power generation portion 2A and the manifolds 27a to 27f so as to prevent leak of the refrigerant to the outside. Further, although not shown, the fuel gas inlet manifold 27a, fuel gas outlet manifold 27f, oxidant gas inlet manifold 27d, and oxidant gas outlet manifold 27c are each surrounded by a gasket different from the gasket 28 so as to prevent leak of the reactant gas.

Figure 4:
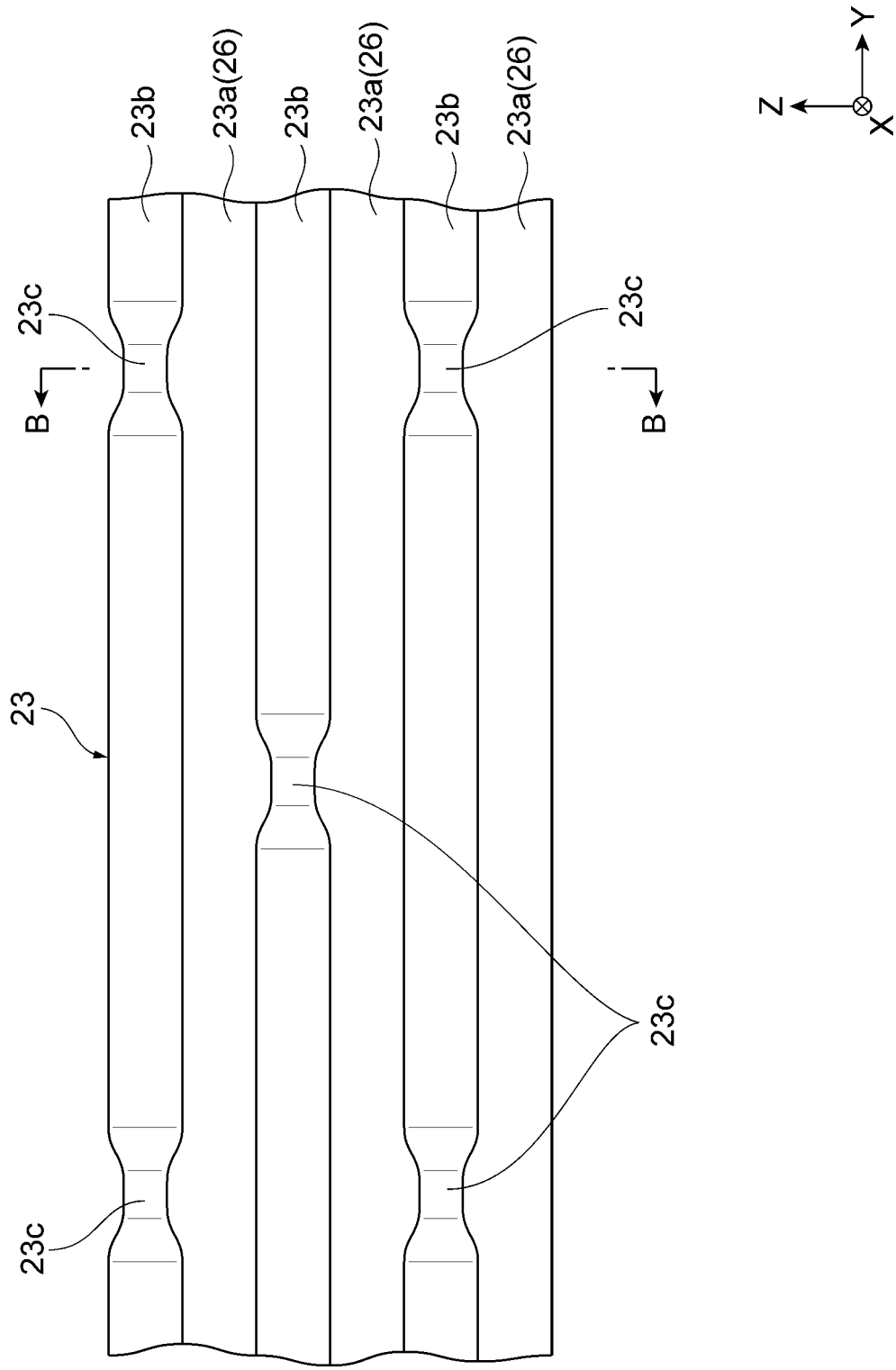
FIG. 4 is a front view for illustration of the structure of a constricted portion.
Figure 5:
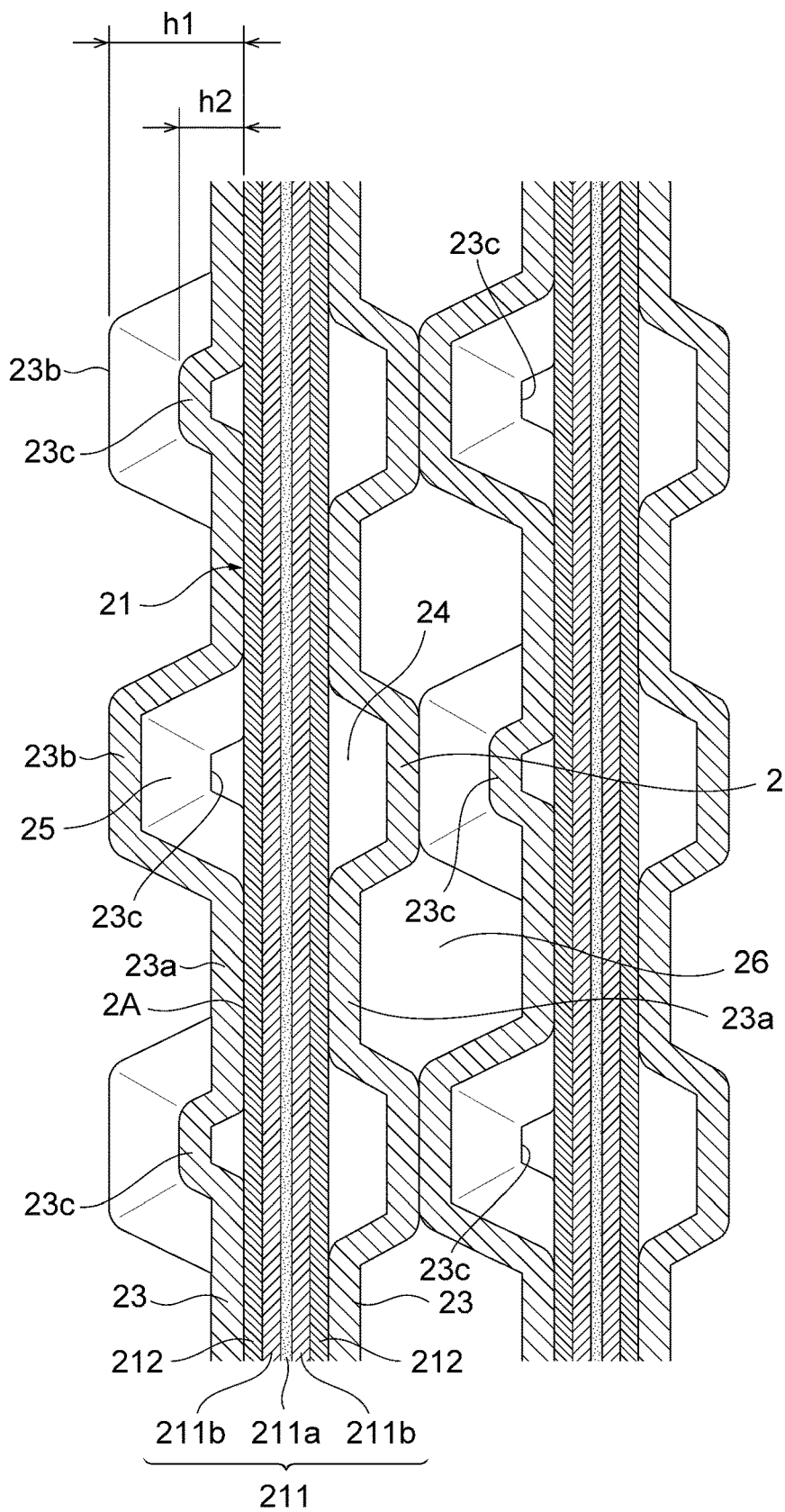
FIG. 5 is a partial cross-sectional view of the constricted portion taken along line B-B of FIG. 4.

In the present embodiment, adjacent refrigerant channels 26 inside the power generation portion communicate with each other via constricted portions 23c, which are formed on the projections 23b of the separator 23, and each of which projects less than each projection 23b. Specifically, as illustrated in FIG. 4 and FIG. 5, for example, a plurality of constricted portions 23c are formed on each projection 23b along the horizontal direction Y. Further, in the stacking direction X, the projecting height h2 of each constricted portion 23c from the gas diffusion layer 212 is lower than the projecting height h1 of each projection 23b from the gas diffusion layer 212 (see FIG. 5). These constricted portions 23c are disposed at a predetermined interval along the horizontal direction Y.

With the constricted portions 23c formed as described above, the flow of a reactant gas flowing through the fuel gas channel 24 or oxidant gas channel 25 is constricted, but adjacent refrigerant channels 26 inside the power generation portion easily communicate with each other via the constricted portions 23c in the gravity direction Z. It should be noted that the constricted portions 23c may be formed on either one or both of the adjacent projections 23b of the adjacent separators 23. Further, the constricted portions 23c may appropriately be formed, with no specific limitations therefor, in any location or arrangement in the projections 23b, unless they significantly affect the flow of the reactant gas.

Further, the refrigerant channel 29 outside the power generation portion and the adjacent refrigerant channel 26 inside the power generation portion communicate with each other via a constricted portion having the same structure as that of the aforementioned constricted portion 23c. Herein, the repeated description will be omitted.

As described above, the refrigerant channel 26 inside the power generation portion and the refrigerant channel 29 outside the power generation portion both allow the communication between the refrigerant inlet manifold 27e and the refrigerant outlet manifold 27b. Thus, as indicated by arrows in FIG. 2, a refrigerant that enters the fuel cell 2 from the refrigerant inlet manifold 27e flows through the refrigerant channels 26 inside the power generation portion that are provided in the region corresponding to the power generation portion 2A toward the refrigerant outlet manifold 27b so as to cool the power generation portion 2A. Further, a part of the refrigerant that enters the fuel cell 2 from the refrigerant inlet manifold 27e flows through the refrigerant channel 29 outside the power generation portion, which is provided in a region above the power generation portion 2A in the gravity direction Z, toward the refrigerant outlet manifold 27b.

Further, if air bubbles are mixed into the refrigerant flowing through the refrigerant channels 26 inside the power generation portion, the mixed air bubbles can sequentially move up from the refrigerant channels 26 on the lower level to those on the upper level in the gravity direction Z via the constricted portions 23c, and further reach the refrigerant channel 29 outside the power generation portion that is located at the uppermost level in the gravity direction Z. Therefore, the air bubbles in the refrigerant flowing through the refrigerant channels 26 inside the power generation portion are reduced, thereby being able to suppress the degraded cooling performance due to the presence of the air bubbles. As a result, insufficient heat-releasing performance of the power generation portion 2A due to the presence of the air bubbles can be prevented, thereby suppressing deterioration of the electrode catalyst layers 211b due to a rapid increase in the temperature.

Meanwhile, the refrigerant channel 29 outside the power generation portion is provided in the region above the power generation portion 2A in the gravity direction Z, that is, the region other than the power generation portion 2A of the fuel cell 2, and is not adapted to cool the power generation portion 2A. Therefore, even if air bubbles collect in the refrigerant flowing through the refrigerant channel 29 outside the power generation portion, the cooling performance is not degraded due to the presence of the air bubbles. Further, the air bubbles that have collected in the refrigerant flowing through the refrigerant channel 29 outside the power generation portion are carried along the flow of the refrigerant to the refrigerant outlet manifold 27b and are then discharged to the outside.

Herein, the cross-section in the gravity direction of the refrigerant channel 29 outside the power generation portion may be larger than that of each refrigerant channel 26 inside the power generation portion. Such a configuration allows the refrigerant to flow faster through the refrigerant channel 29 outside the power generation portion, so that the air bubbles that have collected in the refrigerant channel 29 outside the power generation portion can be quickly discharged to the outside along with the rapid flow of the refrigerant. Therefore, even when a large quantity of air bubbles are present, diffusion of the air bubbles to the refrigerant channels 26 inside the power generation portion can be avoided, so that the insufficient heat-releasing performance of the power generation portion 2A due to the presence of air bubbles can be further suppressed.

Although the embodiment of the present disclosure has been described in detail, the specific configuration is not limited thereto, and any design changes are possible without departing from the spirit and scope of the present disclosure described in the claims.

DESCRIPTION OF SYMBOLS

1 Fuel cell stack
2 Fuel cell
2A Power generation portion
21 MEGA
22 Sealing portion
23 Separator
23a Recess 23b Projection
23c Constricted portion
24 Fuel gas channel
25 Oxidant gas channel
26 Refrigerant channel inside power generation portion
27a Fuel gas inlet manifold
27b Refrigerant outlet manifold
27c Oxidant gas outlet manifold
27d Oxidant gas inlet manifold
27e Refrigerant inlet manifold
27f Fuel gas outlet manifold
28 Gasket
29 Refrigerant channel outside power generation portion

What is claimed is:

1. A fuel cell stack comprising:
a plurality of stacked fuel cells, each fuel cell having a power generation portion and a pair of separators sandwiching the power generation portion;
a refrigerant inlet manifold and a refrigerant outlet manifold disposed at a distance from each other;
a plurality of refrigerant channels inside the power generation portion that are provided in a region corresponding to the power generation portion and that allow communication between the refrigerant inlet manifold and the refrigerant outlet manifold; and
a refrigerant channel outside the power generation portion that is provided in a region above the power generation portion in a gravity direction and that allows the communication between the refrigerant inlet manifold and the refrigerant outlet manifold,
wherein:
the plurality of refrigerant channels inside and the refrigerant channel outside the power generation portion communicate with each other,
each separator has alternately disposed thereon a plurality of recesses that form the plurality of refrigerant channels inside the power generation portion and projections that form reactant gas channels, and
the plurality of refrigerant channels inside the power generation portion that are adjacent to each other communicate with each other, and the refrigerant channel outside the power generation portion and its adjacent refrigerant channel inside the power generation portion communicate with each other, each via constricted portions, the constricted portions being formed on the projections and projecting less than the projections.

2. The fuel cell stack according to claim 1, wherein the refrigerant inlet manifold and the refrigerant outlet manifold are disposed in a direction orthogonal to the gravity direction.

3. The fuel cell stack according to claim 1, wherein a cross-section in the gravity direction of the refrigerant channel outside the power generation portion is larger than that of each refrigerant channel inside the power generation portion.

* * * * *